A. SMITH & W. STEWART, Sr.

Improvement in Apparatus for Molding Sealing-Wax, &c.

No. 132,329.  Patented Oct. 15, 1872.

Witnesses.
Harry King.
J. Williams

Inventors,
Albion Smith
and
William Stewart Sr.
by Dodge & Son
att'ys

UNITED STATES PATENT OFFICE.

ALBION SMITH AND WILLIAM STEWART, SR., OF CINCINNATI, OHIO.

IMPROVEMENT IN APPARATUS FOR MOLDING SEALING-WAX, &c.

Specification forming part of Letters Patent No. 132,329, dated October 15, 1872.

*To all whom it may concern:*

Be it known that we, ALBION SMITH and WILLIAM STEWART, Sr., of the city of Cincinnati, in the county of Hamilton and State of Ohio, have invented certain Improvements in Adjustable Molds for Sealing-Wax and like substances, of which the following is a specification, reference being had to the accompanying drawing.

Our invention relates to a novel apparatus for molding sealing-wax and similar substances; and consists, first, in a kettle or pourer provided with hollow walls and heated by a lamp or by steam, and pivoted in a wheeled frame, so that it can be readily moved over the mold and tilted to pour the wax; and, second, in an adjustable portable mold, as hereinafter explained.

Figure 1:
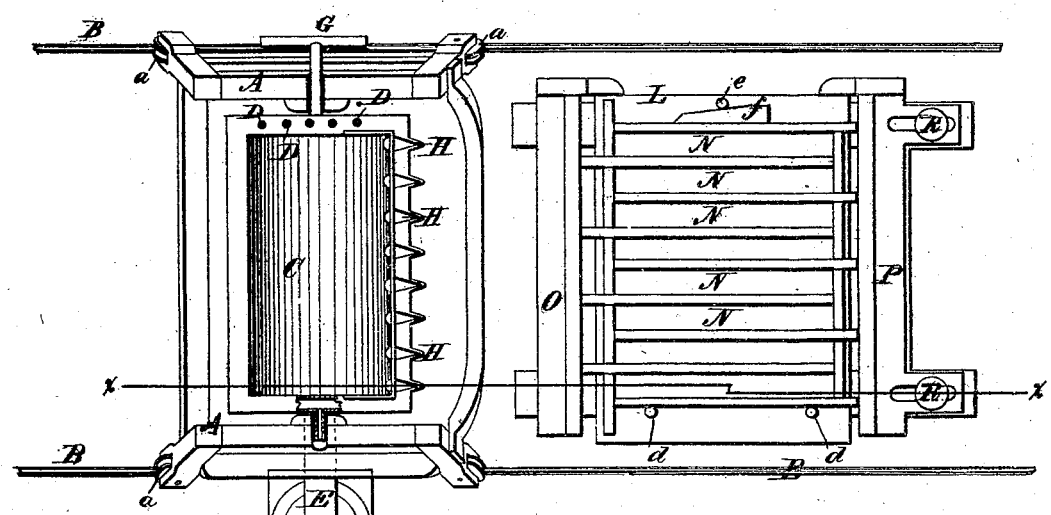
Figure 2:
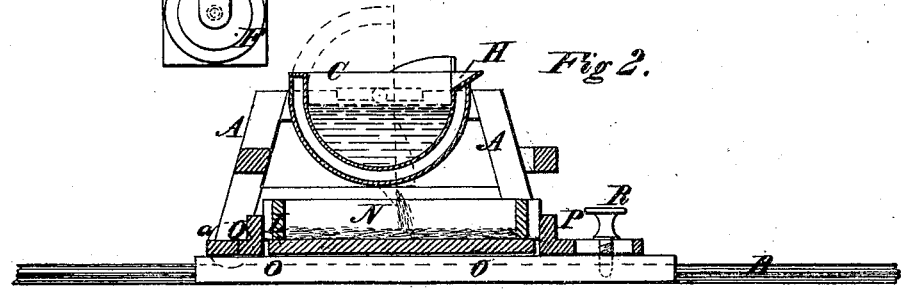
Figure 3:
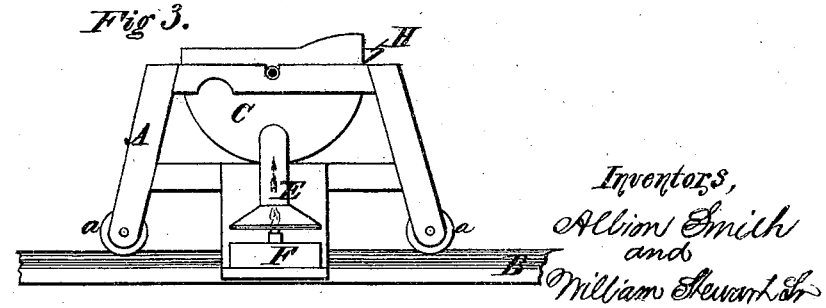
Figure 4:

Figure 1 is a top-plan view of our complete apparatus; Fig. 2, a section of the same on the line $x$ $x$, with the kettle or pourer run forward over the mold; Fig. 3, an end view of the kettle and its carriage; and Fig. 4, a perspective view of one of the bars of which the mold is composed.

The object of our invention is to provide an apparatus by which sealing-wax and like substances may be cast into sticks or bars of any desired weight with rapidity and ease. At present the almost universal practice is to use a heavy slab of stone or metal having molds or cells formed in its face, and to pour the wax into the molds or cells singly from a hand-ladle, which is filled from a stationary melting-pot.

To this course of operation there are many serious objections, prominent among which are that it is slow, laborious, and expensive, and that, as the wax varies greatly in its specific gravity, while the molds are unchangeable in size, the operator must rely entirely on his judgment as to the amount of wax required to produce a stick of the proper weight. These objections, and others of less importance, we overcome by means of our apparatus.

In proceeding to construct the apparatus, we first provide a frame or carriage, A, having four wheels, $a$, and mount it upon a stationary track, B, so that it can run to and fro thereon. Crosswise in the frame we pivot a semi-cylindrical kettle or pourer, C, having hollow or double walls, as shown in Figs. 1 and 2. At one end of the kettle or pourer we make openings D into the top of the hollow walls, as shown in Fig. 1, and at the opposite end we connect a pipe, E, which has its outer end turned downward and provided with a funnel-shaped or flaring mouth, as shown in Fig. 3. Under the mouth of pipe E we mount a large lamp, F, the heat and products of combustion from which pass through the pipe E and the hollow walls of the kettle, and out through the openings D, so as to heat the kettle and keep the wax therein in a molten condition. One of the journals of the kettle or pourer we provide with a handle, G, by which the kettle may be tilted to pour the wax over its edge. The edge over which the wax flows we provide with a series of little lips or spouts, H, to direct the wax in streams into the different molds, which are arranged side by side, as hereinafter described. The lips or spouts, being formed in the edge of the hollow wall, are kept constantly heated, so that there is no danger of the wax cooling and adhering thereto, as would otherwise happen.

Having thus provided our apparatus for melting, carrying, and pouring the wax, we next provide the mold and place it between the rails B, so that the kettle or pourer may be brought over it by moving the frame or carriage A forward. The mold consists of a light metal plate, L, having a series of T-shaped bars, M, arranged on its face side by side, with their heads alternately on the right and left. It will be seen that when the plates are thus arranged cells or molds N are left between them to receive the wax. The end of each bar, it will be observed, passes between the heads of the two adjoining bars, so that by moving the bars endwise the molds may be varied in length as desired. By thus adjusting the molds they may be regulated so as to receive exactly the desired weight of wax, whether the same be of a light or heavy quality.

The series of bars are held on one side by studs $d$ on the plate, and are crowded tightly together by a wedge, $e$, which is supported by a pin or stud, $f$, at the opposite side of the plate, as shown in Fig. 1. By simply removing the wedge the whole series of bars are released, so that they may be adjusted or removed as desired. In order to hold the mold in position, and to hold the bars so as to produce the sticks of wax of uniform size, we secure between the rails a bed or frame, O, having on one side an adjustable bar, P, held by thumb-screws R, as shown in Figs. 1 and 2.

In preparing the mold for use, the plate L is laid upon the frame O, the bars arranged on the plate and adjusted, and then the bars P set up against their ends, and the wedge inserted at the side, as shown. In this way the bars are all secured in place, and their heads held in line so as to make all the sticks of precisely the same length and size. The bars P being once adjusted are fastened and allowed to remain as long as the one quality of wax is to be molded, while the molds are removed as fast as filled and replaced by empty ones.

In operating our apparatus the wax is placed in the kettle and the lamp placed in position to heat it. A mold is then placed on the frame O and adjusted, and the frame or carriage A drawn forward so as to bring the kettle over the mold, and then the handle G operated so as to tip the kettle and cause the wax to flow through the lips H and fill all the cells of the mold at once. As soon as the cells are filled the kettle is permitted to turn up, and the frame is pushed back to carry it out of the way. The mold is then removed and an empty one inserted in its place, and filled in like manner by drawing the frame forward and tipping the kettle, and so on repeatedly.

The wax in the molds may be allowed to cool gradually, or cooled by immersing the molds in water. As soon as the wax is hard it is removed by loosening the bars M so as to release the sticks, or by turning the plate L up and jarring the sticks out of the cells—the former being the usual method.

From the above description it will be seen that by the use of our apparatus wax may be molded with great ease and rapidity, and in sticks of the precise weight desired. There is no handling or carrying of the wax, no labor in handling the heavy slabs, and no uncertainty as to the amount of wax required.

It is obvious that instead of using the lamp to heat the wax gas-lights may be arranged in any suitable manner for the purpose, or steam introduced into the hollow walls of the kettle.

Instead of using the kettle in connection with a single mold, as described, any desired number of molds may be placed between the rails and filled in succession, so that while the empty ones are being filled the others may be removed and replaced.

Having thus described our invention, what we claim is—

1. The hollow-walled pivoted kettle, provided with the openings D and pipe E, in combination with the lamp F, arranged to operate as described.

2. The wheeled frame A, provided with the pivoted kettle C, heated by the lamp or its equivalent, whereby the wax may be melted, carried to the mold, and poured therein with ease and dispatch.

3. The adjustable mold, consisting of the plate L and the T-shaped bars M, when arranged as described.

4. In combination with the above, the frame O, provided with the adjustable bar P, as and for the purpose set forth.

5. In combination with the carriage having the kettle provided with the series of lips, and the stationary mold provided with a corresponding series of cells, we claim the rails B, by means of which the kettle is guided so that its lips discharge into the respective cells.

ALBION SMITH.
WILLIAM STEWART, Sr.

Witnesses:
  Thomas Ruane,
  J. B. McClymon.